Sept. 30, 1924.  
H. A. FULLER  
CONTROL FOR FOUR-WHEEL BRAKE MECHANISM  
Filed Jan. 2, 1924
1,510,315
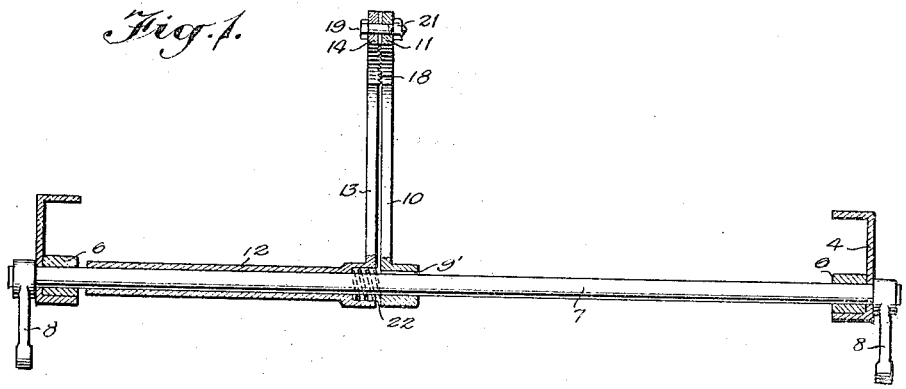
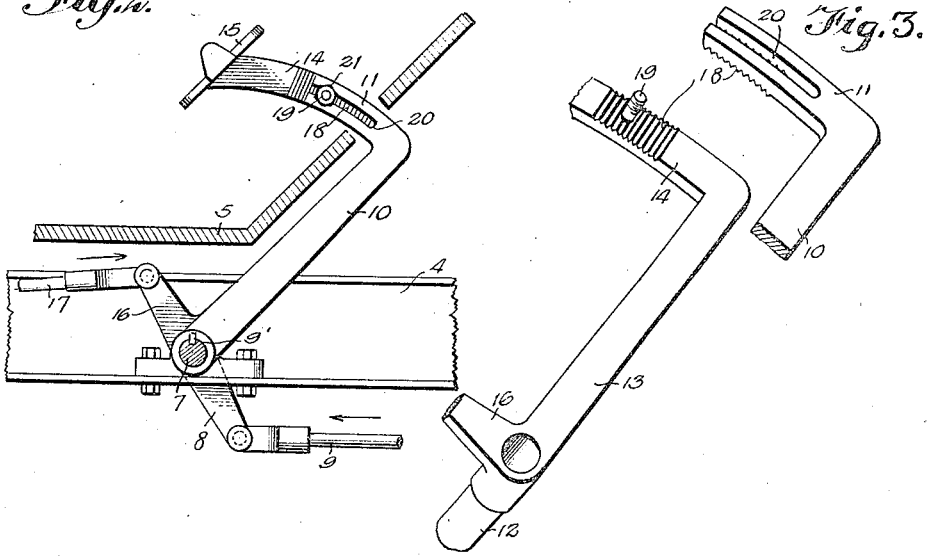
WITNESSES
INVENTOR
H.A.FULLER
BY
ATTORNEYS Patented Sept. 30, 1924.

1,510,315

UNITED STATES PATENT OFFICE.

HARRY A. FULLER, OF BROOKLYN, NEW YORK.

CONTROL FOR FOUR-WHEEL-BRAKE MECHANISM.

Application filed January 2, 1924. Serial No. 683,991.

*To all whom it may concern:*

Be it known that I, HARRY A. FULLER, a citizen of the United States, and a resident of the city of New York, borough of Brooklyn, in the county of Kings and State of New York, have invented a new and Improved Control for Four-Wheel-Brake Mechanism, of which the following is a full, clear, and exact description.

This invention relates to improvements in brakes for motor vehicles, and has particular reference to a control mechanism for four wheel brakes.

An object of the invention is to provide an improved mechanism for four wheel brake apparatus which permits of regulating the application of the sets of brakes associated with the various wheels in such manner that the braking power of one set may exceed and take effect sooner than that of the other set.

Another object is to provide a mechanism which may be so adjusted that one set of brakes may be operated entirely to the exclusion of the other set.

A further object is the provision of a simple and effective mechanism which is so constructed and arranged that the various adjustments thereof may be easily and quickly made.

The above and other objects will appear more clearly from the following detailed description when taken in connection with the accompanying drawing which illustrates a preferred embodiment of the inventive idea.

In the drawing—

Figure 1 is a transverse section through a part of the chassis of a motor vehicle with the control mechanism shown partly in elevation, and partly in section;

Figure 2 is a side elevation of the control mechanism partly in section; and

Figure 3 is a fragmentary perspective view of the operating members of the control mechanism.

Referring more particularly to the accompanying drawing, the numeral 4 indicates the chassis of a motor vehicle and 5 the usual floorboard thereof located beneath the driver's seat. Mounted in suitable bearings 6 secured to the chassis 4 are the ends of a rocking shaft 7 which extend outwardly beyond said chassis and which carry the arms 8 connected by pull rods 9 to the brakes comprising the set associated with the front wheels of the vehicle.

Intermediate the ends of the shaft 7 the same has keyed thereto at 9' an operating arm 10 of angular formation extending diagonally upward from the shaft 7 and having its free extremity 11 projecting through the floorboard 5. Interposed between the member 10 and one side of the chassis 4 and rockingly supported upon the shaft 7 is a sleeve member 12, the end of which adjacent the chassis is spaced slightly therefrom to permit of a longitudinal movement of the sleeve and parts carried thereby on the shaft 7. Preferably formed integrally with the sleeve 12 is an operating member 13 which cooperates with the member 10 which is of substantially the same shape as the latter member. The free end 14 of the member 13, which is arranged in juxtaposition to the end 11 of the member 10, projects beyond the extremity of said end 11 and terminates in a foot pedal 15 which is utilized to actuate the operating members. The sleeve 12 also has formed integrally therewith and preferably in the same vertical plane as the operating member 13 an arm 16 to which is connected a pull rod extending to the brake mechanism for the rear wheels.

The opposed inner faces of the ends 11 and 14 of the members 10 and 13 are provided with teeth or serrations 18, which are normally engaged with each other so that a depression of the foot pedal 15 to operate the member 13 will also actuate the member 10. It will be apparent that such an operation will exert a forward pull upon the rod 17 through the medium of the arm 16 and will also rock the shaft 7 to which is keyed the member 10 to exert a rearward pull upon the rod 9 thus effecting an operation of both the front and rear sets of brakes. In order to securely maintain the members 10 and 13 in cooperating relation the end 14 of the latter member carries a bolt 19 which is extended through a longitudinal slot 20 formed in the end 11 of the member 10. This bolt carries a nut 21 which may be tightened against the adjacent face of the end 11 to cause the teeth 18 to be securely engaged with each other.

In the operation of four wheel brake mechanisms it is essential that the same be so adjusted that when the brake pedal is operated the rear set of brakes will take effect before the front set. It has heretofore been extremely difficult to properly adjust the two sets of brakes not only because of the complications of the brake mechanism, but also because it is necessary for the person making the adjustment to do so from beneath the car while the same is at a standstill. With the present invention the adjustment of the brakes may be easily and quickly performed while the car is running, if desired, by a person seated in the driver's seat. To do this the nut 21 is first loosened whereupon the members 10 and 13 and particularly the teeth 18 will be forced apart by a coil spring 22 mounted in a recess in one end of the sleeve 12 and engageable with an adjacent portion of the arm 10. The expansion of this spring when the nut 21 is loosened causes the sleeve 12 to be moved longitudinally of the shaft 7 to separate the operating members. When in this position it will be obvious that the foot pedal may be actuated to operate the rear brakes entirely to the exclusion of the front brakes, in which instance the bolt 19 will move freely in the slot 20 in the member 10 with the result that the latter member will not be depressed. Should it be desired to adjust either the pull rods 9 or 17 so as to cause the brake mechanisms to which they are connected to be actuated more or less quickly either the member 10 or the member 13 may be moved relative to the other member after the nut 21 has been loosened to draw rearwardly upon the pull rod 9 or forwardly upon the pull rod 17 until the desired adjustment is obtained. The nut 21 may then be again tightened to engage the cooperating teeth to secure the members 10 and 13 in their relative adjusted positions.

What is claimed is:

1. In a control mechanism for four wheel brakes, the combination with pull rods for each set of brakes; of a rocking shaft to which one of said pull rods is connected, an operating member secured to said shaft, a second operating member connected to the other pull rod and having a rotary movement with respect to said shaft and adjustable with respect to the first-named operating member, and means for securing said operating members together in various adjusted positions with respect to each other so that an operation of one of said members will be imparted to the other to actuate the set of brakes.

2. In a control mechanism for four wheel brakes, the combination with pull rods for each set of brakes; of a rocking shaft to which one of said pull rods is connected, an operating member secured to said shaft, a second operating member connected to the other pull rod and having a rotary movement with respect to said shaft and adjustable with respect to the first-named operating member, means for securing said operating members together in various adjusted positions with respect to each other so that an operation of one of said members will be imparted to the other to actuate the sets of brakes, and resilient means for forcing said operating members apart to permit of an independent operation of one of them when said securing means is rendered inoperative.

3. In a control mechanism for four wheel brakes, the combination with pull rods for each set of brakes; of a rocking shaft connected to one of said pull rods, an operating member having one end secured to said shaft and its other end provided with a longitudinally extending slot, a sleeve mounted for rotation on said shaft and having a second operating member formed upon one end thereof adjacent the first-named operating member, said second operating member being connected to the pull rod and terminating in a foot pedal, adjacent portions of said operating members being provided with cooperating teeth, securing means carried by the second-named operating member and extending through the slot in the first-named member to engage said cooperating teeth to prevent relative movements of said operating members when said securing means is in operative position, and means interposed between said operating members to disengage said teeth to permit of an adjustment of one of the operating members with respect to the other and to permit of an independent operation of one of said members with respect to the other.

HARRY A. FULLER.